United States Patent
Miettinen et al.

(10) Patent No.: US 9,025,433 B2
(45) Date of Patent: May 5, 2015

(54) APPARATUS AND METHOD FOR HANDLING VALID PROTOCOL DATA UNITS

(75) Inventors: Tero Petteri Miettinen, Oulu (FI); Antti Ilmari Tormanen, Oulunsalo (FI); Antti Johannes Rauhala, Oulu (FI); Mika Petteri Kaukoranta, Sipoo (FI); Tommi Matias Eemeli Kallio, Oulu (FI)

(73) Assignee: Nokia Corporation, Espoo (FI)

(*) Notice: Subject to any disclaimer, the term of this patent is extended or adjusted under 35 U.S.C. 154(b) by 156 days.

(21) Appl. No.: 13/510,615

(22) PCT Filed: Dec. 21, 2009

(86) PCT No.: PCT/IB2009/055886
§ 371 (c)(1),
(2), (4) Date: May 17, 2012

(87) PCT Pub. No.: WO2011/077184
PCT Pub. Date: Jun. 30, 2011

(65) Prior Publication Data
US 2012/0230180 A1 Sep. 13, 2012

(51) Int. Cl.
*H04W 28/04* (2009.01)
*H04L 1/18* (2006.01)
(Continued)

(52) U.S. Cl.
CPC ............ *H04L 1/1841* (2013.01); *H04L 1/1809* (2013.01); *H04W 28/04* (2013.01); *H04W 80/02* (2013.01); *H04L 1/0061* (2013.01); *H04L 1/0083* (2013.01); *H04L 1/0091* (2013.01)

(58) Field of Classification Search
None
See application file for complete search history.

(56) References Cited

U.S. PATENT DOCUMENTS

| 5,936,965 A * | 8/1999 | Doshi et al. .................. 370/469 |
| 2009/0279569 A1* | 11/2009 | Reddy ............................ 370/474 |
| 2011/0263221 A1* | 10/2011 | Yi et al. ......................... 455/410 |

FOREIGN PATENT DOCUMENTS

| CN | 101171806 A | 4/2008 |
| CN | 101268673 A | 9/2008 |
| EP | 1720322 A1 | 11/2006 |

(Continued)

OTHER PUBLICATIONS

"3rd Generation Partnership Project; Technical Specification Group Radio Access Network; Evolved Universal Terrestrial Radio Access (E-UTRA) Radio Link Control (RLC) protocol Specification (Release 8)", 3GPP TS 36.322, v8.7.0, Sep. 2009, pp. 1-39.

(Continued)

*Primary Examiner* — Hassan Kizou
*Assistant Examiner* — Hashim Bhatti (57) ABSTRACT

An example apparatus is provided that receives a plurality of protocol data units (PDUs) formatted according to a standard that prescribes segmenting service data units (SDUs) into sequential PDUs. Each SDU is segmented into PDU(s), and each PDU includes data field element(s). The apparatus detects a current received PDU including data field element(s) that do not belong to a SDU, and handles the detected PDU. This handling includes one or more of (a) accepting the detected PDU but discarding the data field element(s) of the respective PDU; (b) discarding the detected PDU including the data field element(s) of the respective PDU; (c) processing the detected PDU and forming a SDU from the data field element(s) of the respective PDU; or (d) handling the error as a radio link failure. The apparatus then operates according to the standard with respect to the received PDUs after handling the detected PDU.

18 Claims, 6 Drawing Sheets (51) Int. Cl.
*H04W 80/02* (2009.01)
*H04L 1/00* (2006.01)

(56) References Cited

FOREIGN PATENT DOCUMENTS

| EP | 1720322 | A1 | * | 11/2006 | ............ H04L 12/56 |
| EP | 1764980 | A1 | | 3/2007 | |
| EP | 1764980 | A1 | | 3/2007 | |
| EP | 1764980 | B1 | * | 10/2008 | ............ H04L 29/08 |
| EP | 2073423 | A1 | | 6/2009 | |
| EP | 2073423 | A1 | | 6/2009 | |
| WO | 2009/145420 | A1 | | 12/2009 | |
| WO | WO 2009145420 | A1 | * | 12/2009 | ............ H04W 28/06 |

OTHER PUBLICATIONS

International Search Report and Written Opinion received for corresponding International Patent Application No. PCT/IB2009/055886, dated Sep. 22, 2010, 14 pages.

* cited by examiner

APPARATUS AND METHOD FOR HANDLING VALID PROTOCOL DATA UNITS

RELATED APPLICATION

This application was originally filed as PCT Application No. PCT/IB2009/055886 filed Dec. 21, 2009.

TECHNICAL FIELD

Example embodiments of the present invention generally relate to handling protocol data units and, more particularly, relate to an apparatus and method for handling valid protocol data units whose data field elements may not belong to a full service data unit.

BACKGROUND

The modern communications era has brought about a tremendous expansion of wireline and wireless networks. Computer networks, television networks and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

In one example network configuration, mobile users communicate with each other via communication links maintained by the network. In this regard, for example, an originating station may typically communicate data to network devices in order for the network devices to relay the data to a target station. An entity referred to as a radio link controller (RLC) may manage the transmission of data of each radio bearer via different types of RLC modes. Some examples of modes may include a transparent mode (TM), an acknowledged mode (AM) and an unacknowledged mode (UM). For example, TM may be a mode in which no overhead is attached to an RLC service data unit (SDU) received from a higher layer when constituting a protocol data unit (PDU). As such, the RLC may pass the SDU in a transparent manner. In non-transparent modes like AM and UM, overhead is added at the RLC.

In AM, the AM RLC constitutes a PDU by adding a PDU header that includes a sequence number that can be used by the receiver to determine the correct order of the received PDUs, and thus, to determine whether a PDU has been lost during transmission. By setting a polling request to the RLC PDU, the transmitter may request that the receiver also provide acknowledgement for PDUs received. Thus, the receiver may request re-transmission for PDUs that were not received in order to improve efforts to provide error-free data transmission via re-transmissions when necessary. Due to the potential for re-transmissions, AM may be more well suited for non-real-time packet transmissions.

UM, unlike AM, does not provide acknowledgement for PDUs received. Thus, although the receiver may still use a sequence number provided in the PDU header to determine whether any PDU has been lost, the transmitter receives no acknowledgements for PDUs transmitted and therefore does not check whether the receiver is properly receiving transmitted PDUs. Thus, once a PDU is transmitted, the PDU is typically not retransmitted.

BRIEF SUMMARY

At the transmitting end, through segmentation, radio link controller (RLC) service data units (SDUs) may be separated into RLC PDU data field elements. And through concatenation, the RLC PDU data field elements may be combined into RLC PDUs. In various instances, a radio link controller (RLC) protocol data unit (PDU) may be received that includes reserved or invalid values, and in such instances, the receiving end may be directed to discard the RLC PDU. However, it may be possible for a receiving UM/AM RLC entity to receive RLC PDUs, whose data field element does not belong to a full or otherwise complete SDU, even if the protocol data in RLC PDU does not otherwise include reserved or invalid values. These erroneous RLC PDUs may, for example, result from changing of the RLC PDUs in the air interface, whereby the change is not otherwise detected in any CRC calculation performed by the receiver. Erroneous RLC PDUs may also result, for example, from an implementation error in the transmitter of the transmitting end. Example embodiments of the present invention are therefore directed to handling these erroneous RLC PDUs.

According to one aspect of example embodiments of the present invention, an apparatus is provided that includes a processor and a memory storing executable instructions that in response to execution by the processor cause the apparatus to implement a multi-layered protocol stack including a data link layer and one or more upper layers above the data link layer. The apparatus is also caused at least perform a number of operations, including receiving a plurality of PDUs (e.g., RLC PDUs) formatted according to a standard (e.g., E-UTRAN) that prescribes segmenting sequential SDUs into sequential PDUs. Each SDU being segmented into one or more PDUs, and each PDU includes one or more data field elements. The operations also include, at a radio link control sub-layer of the data link layer, detecting a current received PDU including one or more data field elements that do not belong to a SDU, and handing the detected PDU. This handling of the detected PDU includes one or more of the following: (a) accepting the detected PDU but discarding the one or more data field elements of the respective PDU; (b) discarding the detected PDU including the one or more data field elements of the respective PDU; (c) processing the detected PDU and forming a SDU from the one or more data field elements of the respective PDU; or (d) notifying an upper layer about an error in reception of the protocol data units to thereby enable the upper layer to handle the error as a radio link failure. The operations may then include operating according to the standard with respect to the received PDUs after handling the detected PDU.

Each PDU may further include a sequence number reflecting the sequence of the PDUs, and include a value that indicates whether the SDU from which the respective PDU is formed continues in a succeeding PDU or whether a succeeding sequential SDU will start in the succeeding sequential PDU. In such instances, the current received PDU that does not belong to a SDU may be detected based on the value of the respective current PDU, and based on the values of a preceding and a succeeding PDU, where the preceding and succeeding PDUs may be identified by the sequence numbers of the respective current, preceding and succeeding PDUs. Also in such instances, when handing the detected PDU includes processing the detected PDU and forming a SDU from the one or more data field elements of the respective PDU, processing the detected PDU may include correcting the value of the detected PDU based on the values of the preceding and succeeding PDUs.

When handling the detected PDU includes accepting the detected PDU but discarding the one or more data field elements of the respective PDU, operating according to the standard may further include an upper layer deciding whether to request retransmission of the detected PDU.

When handing the detected PDU includes discarding the detected PDU including the one or more data field elements of the respective PDU, operating according to the standard may include requesting transmission of the detected PDU.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data", "content", "information" and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 1:
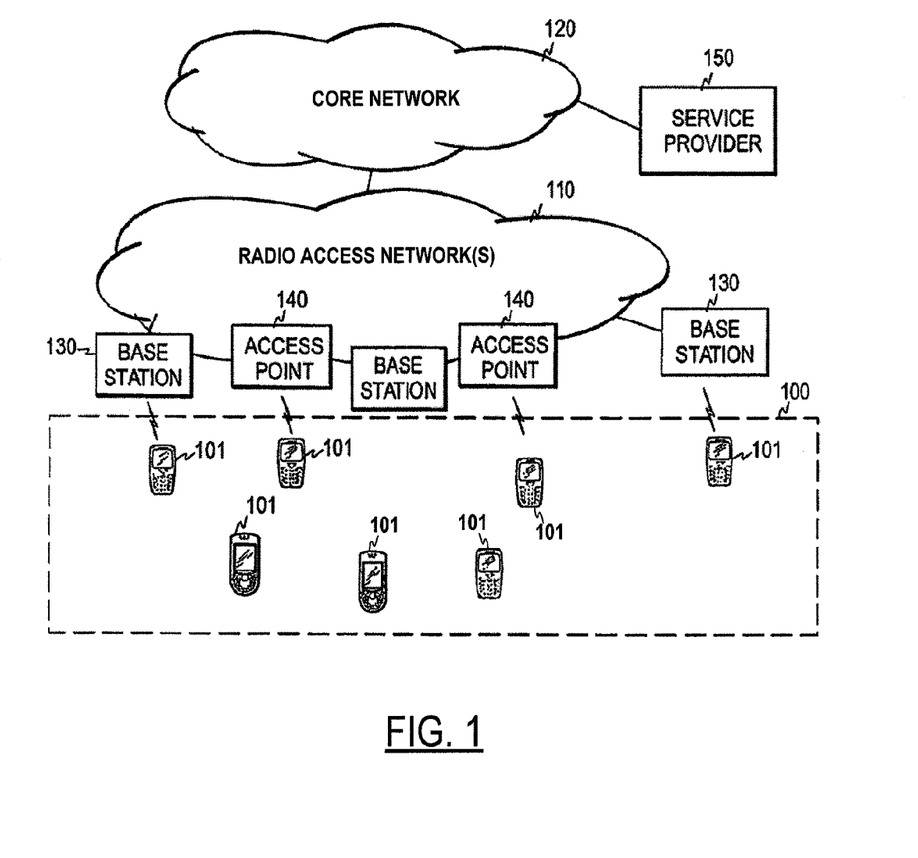
FIG. 1 illustrates a general communication environment according to example embodiments of the present invention.

FIG. 1 illustrates a general communication environment in which example embodiments of the present invention may be applied. The communication environment includes three interacting domains: a user equipment domain 100, an access domain including several radio access networks 110, and a backbone domain including a core network 120.

The above communication environment may include a mobile network and one or more short-range wireless networks, and may therefore include one or more base stations 130 (or node B elements), access points 140 or the like. Examples of these networks may include 3GPP radio access networks, Universal Mobile Telephone System (UMTS) radio access UTRAN (Universal Terrestrial Radio Access Network), Global System for Mobile Communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3G or 3.9G (also referred to as UTRAN Long Term Evolution (LTE) or Super 3G) or E-UTRAN (Evolved UTRAN) networks. Generally, a radio access network may refer to any 2G, 3G, 4G or higher generation mobile communication network and their different versions, radio frequency (RF) or any of a number of different wireless networks, as well as to any other wireless radio access network that may be arranged to interwork with such networks.

The user equipment domain 100 may include a plurality of user equipment (UE) 101, mobile terminals or the like. In this context, the user equipment may be multimode user equipment. Multimode user equipment may here refer to user equipment that has at least two operation modes, i.e., at least two radio interfaces based on different connectivity standards. Although one operation mode may be provided for communicating with the mobile network, the user equipment may also be provided with one or more other operation modes, in which a short-range radio of the user equipment may be active. The user equipment may have different states with respect to each operation mode, and the states allowed concurrently depend on the implementation of the user equipment.

The radio access network 110 and/or core network 120 may further be connected to one or more external networks, such as the Internet. The core network and/or the external network may include one or more service providers 150 to provide respective services to other apparatuses such as the user equipment 101.

Figure 2:
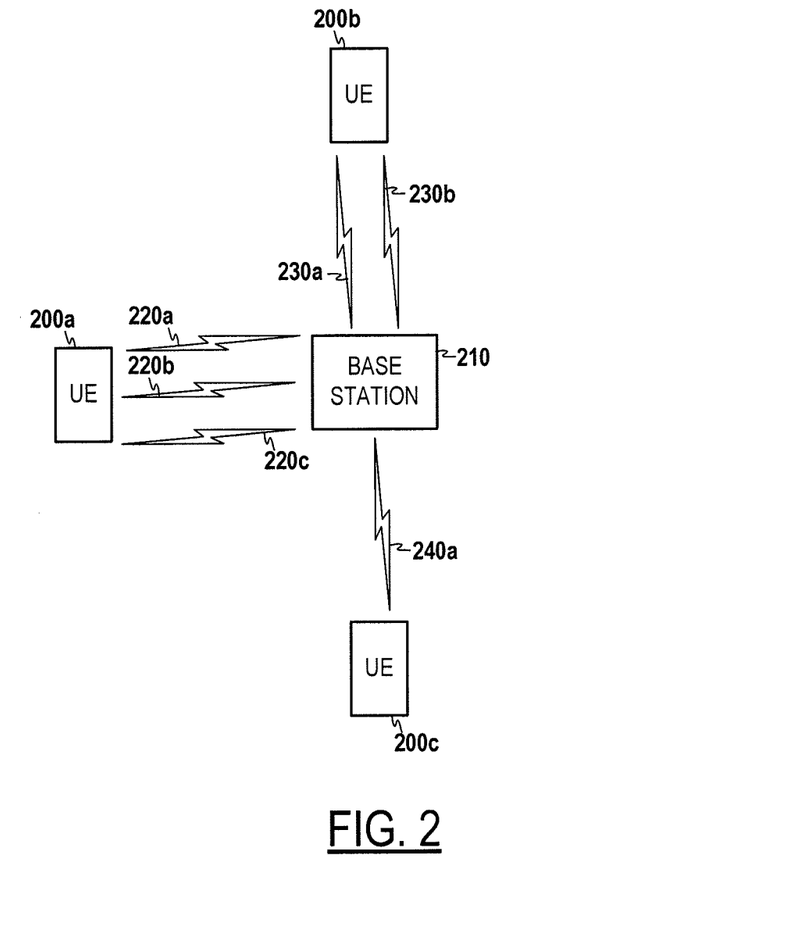
FIG. 2 illustrates a segment of the communication environment of FIG. 1 according to example embodiments of the present invention.

FIG. 2 illustrates a segment of the communication environment of FIG. 1 including a number of user equipment (UE) 200 (three being shown as UE 200a, 200b, 200c) interacting with a base station 210, according to example embodiments of the present invention. As shown, the base station may be in communication with the user equipment via logical communication channels known as "radio bearers." In various example embodiments, each radio bearer may be mapped to a pair of peer entities: one peer entity in the user equipment and one peer entity in the base station. In various embodiments, each apparatus may include multiple peer entities. For example, the base station and user equipment 200c may include one peer entity pair (using radio bearer 240a). The base station and user equipment 200b may include two peer entity pairs (using radio bearers 230a and 230b), such that the respective user equipment includes two peer entities. The base station and user equipment 200a may include three peer entity pairs (using radio bearers 220a, 220b and 220c), such that the respective user equipment includes three peer entities. As a result, the base station may include six peer entities: three connected with user equipment 200a, two connected with user equipment 200b and one connected with user equipment 200c. These peer entity pairs may operate mostly independently. For example, if an error occurs involving the peer entities associated with radio bearer 220a, it may be possible for the peer entities associated with radio bearers 220b and 220c to continue operation. The operations of the peer entities are described in further detail below.

Figure 3:
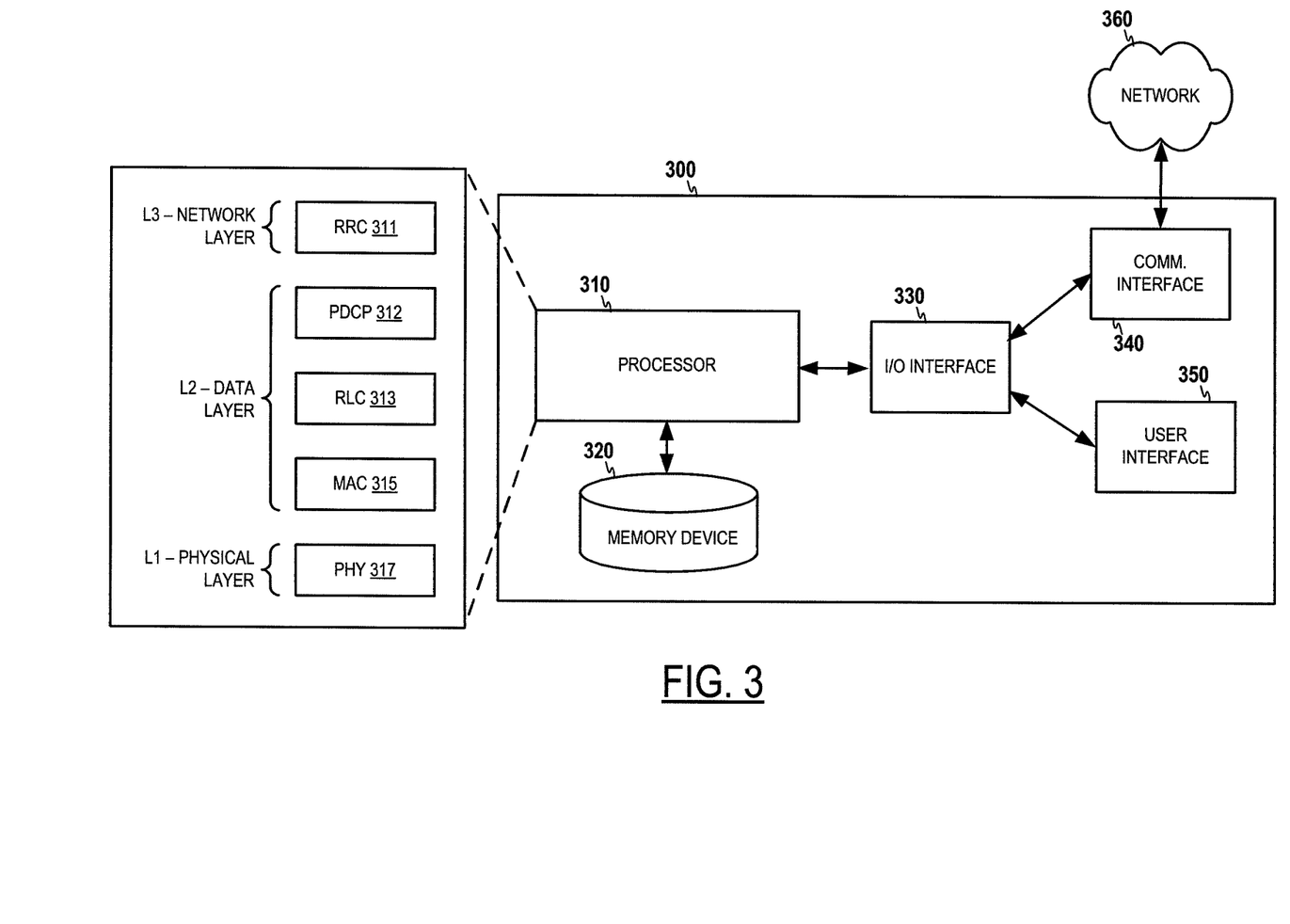
FIG. 3 illustrates an apparatus that may be configured to operate within the network architecture of FIG. 1, according to various example embodiments of the present invention.

Reference is now made to FIG. 3, which illustrates an apparatus 300 according to example embodiments of the present invention configured to perform the various functionalities described herein. As shown and described herein, the example apparatus may be configured to function as or otherwise implement one or more of the network components depicted in FIG. 1 (e.g., user equipment 101, base station 130, access point 140, service provider 150, etc.)—and may at times be referenced by the users of the respective components. The example apparatus depicted in FIG. 3 may also be configured to perform example methods of the present invention, such as those described with respect to FIG. 8.

In some example embodiments, the apparatus 300 may, be embodied as, or included as a component of, a communications device with wired or wireless communications capabilities. In this regard, the apparatus may be configured to operate in accordance with the functionality of one or more network elements as described herein. The example apparatus may include or otherwise be in communication with one or more processors 310, memory devices 2320, Input/Output (I/O) interfaces 330, communications interfaces 340 and/or user interfaces 350 (one of each being shown). The processor may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, the processor may be representative of a plurality of processors, or one or more multiple core processors, operating in concert. Further, the processor may be comprised of a plurality of transistors, logic gates, a clock (e.g., oscillator), other circuitry, and the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 310 may be an entity configured to perform operations according to embodiments of the present invention while configured accordingly. Thus, in example embodiments where the processor is embodied as, or is part of, an ASIC, FPGA, or the like, the processor is specifically configured hardware for conducting the operations described herein. Alternatively, in example embodiments where the processor is embodied as an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 320 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 310.

Further, the memory device 320 may be configured to store information, data, applications, computer-readable program code instructions, and/or the like for enabling the processor 310 and the example apparatus 300 to carry out various functions in accordance with example embodiments of the present invention described herein. For example, the memory device may be configured to buffer input data for processing by the processor. Additionally, or alternatively, the memory device may be configured to store instructions for execution by the processor.

The I/O interface 330 may be any device, circuitry, or means embodied in hardware, software or a combination of hardware and software that is configured to interface the processor 310 with other circuitry or devices, such as the communications interface 340 and/or the user interface 350. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 300 to perform, various functionalities of the present invention.

The communication interface 340 may be any device or means embodied in hardware, software or a combination of hardware and software that is configured to receive and/or transmit data from/to one or more networks 360 (e.g., radio access networks 110, core networks 120, etc.) and/or any other device or module in communication with the example apparatus 300. The processor 310 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 340 may be configured to provide for communications in accordance with any of a number of wired or wireless communication standards. The communications interface may be configured to support communications in multiple antenna environments, such as multiple input multiple output (MIMO) environments. Further, the communications interface may be configured to support orthogonal frequency division multiplexed (OFDM) signaling. In some example embodiments, the communications interface may be configured to communicate in accordance with various techniques including, as explained above, any of a number of 2G, 3G, 4G or higher generation mobile communication technologies, radio frequency (RF), IrDA or any of a number of different wireless networking techniques. The communications interface may also be configured to support communications at the network layer, possibly via Internet Protocol (IP).

The user interface 350 may be in communication with the processor 310 to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device 320). In some example embodiments, the user interface circuitry is configured to facilitate user control of at least some functions of the apparatus 300 through the use of a display and configured to respond to user inputs. The processor may also comprise, or be in communication with, display circuitry configured to display at least a portion of a user interface, the display and the display circuitry configured to facilitate user control of at least some functions of apparatus.

As also shown in FIG. 3, the processor 310 may be configured to create and control a series of logical networking layers and sub-layers used in wireless communication. Understanding of a portion of these layers may facilitate the explanation of the disclosed subject matter and the relationship of peer entities to one another.

The Open Systems Interconnection Basic Reference Model (OSI Model) is a commonly-used layered, abstract description for communications and computer network protocol design. A layer, in this context, may include a collection of related functions that provide services to the layer above it and receives service from the layer below it. For example, a layer that provides error-free communications across a network provides the path needed by applications above it, while it uses the next lower layer to send and receive packets that make up the contents of the path. The layers, therefore, are hierarchal and each layer provides a greater level of abstraction from the layer below. From top to bottom, the OSI Model includes application, presentation, session, transport, network, data link, and physical layers.

Of immediate interest are the lower three layers of the OSI Model: the network layer, the data layer, and the physical layer. In the OSI Model, the network layer (L3) generally performs network routing functions. The data or data-link layer (L2) generally provides the functional and procedural means to transfer data between network entities (e.g., peer entities) and to detect and possibly correct errors that may occur in the physical layer. And the physical layer (L1) may generally define the relationship between a device and a physical medium. In various example embodiments, the communication interface 340 may manage or control the physical layer (PHY) 317. In one example embodiment, the processor 310 may control a sub-layer in the network layer known as the radio resource control (RRC) sub-layer 311, which in various example, embodiments, may be included in the UMTS protocol and more specifically the E-UTRAN protocol, its predecessors and/or derivatives (hereafter "the E-UTRAN standard").

The RRC sub-layer 311 may, in one example embodiment, handle the control signaling of the network layer between user equipment and other UTRAN devices (e.g., a base station or in EUTRAN parlance, "EUTRAN Node B (eNB)"). The RRC sub-layer may also, in one example embodiment, perform functions for connection establishment and release, broadcast of system information, radio bearer establishment, reconfiguration and releases, RRC connection mobility procedures, paging notification and release, outer loop power control or the like. As a higher network layer, the RRC sub-layer may, in one example embodiment, control or be associated with any lower network layers (e.g., the data layer). In various example embodiments, the RRC sub-layer or RRC sub-layer instantiations may create or reset any lower network layers associated with the RRC sub-layer.

In one example embodiment, the processor 310 may control at least three sub-layers in the data layer. These sub-layers may include the packet data convergence protocol (PDCP) sub-layer or protocol 312, the radio link control (RLC) sub-layer or protocol 313 and the medium access control (MAC) sub-layer or protocol 315. In one example embodiment, the PDCP sub-layer may perform header compression and decompression, transfer of user data and maintenance of sequence numbers for bearers. The RLC sub-layer may, in one example embodiment, control the flow and error control of data between peer entities and may operate in one or more of a number of different modes, including a transparent mode (TM), an acknowledged mode (AM) or an unacknowledged mode (UM). The MAC sub-layer may, in one example embodiment, provide addressing and channel access control mechanisms that make it possible for the network nodes (e.g., user equipment and base stations) to communicate within the network.

In one example embodiment, each radio bearer may be mapped, in the RLC sub-layer 313, to a RLC entity (also referred to as a peer entity or RLC peer entity). For example, the radio bearer 220a of FIG. 2 may be mapped to a RLC or peer entity in user equipment 200a and a RLC or peer entity in the base station 210. In such an example embodiment, each RLC peer entity in a user equipment may have a corresponding RLC peer entity in the base station. In one example embodiment, the RLC sub-layer may package service data units (SDUs) into RLC protocol data units (PDUs) each of which includes a data element belonging to a SDU (i.e., a SDU is formed from the data elements of one or more PDUs). These PDUs may be used to deliver data between RLC peer entities. In one example embodiment, the PDUs may be assigned a packet sequence number (PSN) that uniquely identifies the PDU within a certain transmission window or time frame.

In one example embodiment, each apparatus 300 may include only one instantiation of the MAC sub-layer 315. In various example embodiments, this MAC sub-layer may be associated with multiple RLC peer entities. In such an example embodiment, when transmitting data, the MAC sub-layer may multiplex the RLC PDUs from several RLC entities into one or more transport blocks (TBs).

In various example embodiments using the E-UTRAN standard, time may be divided into increments known as Transmission Time Intervals (TTIs). During each TTI the MAC sub-layer 315 may transmit or receive one or more TBs. For example, during each TTI, user equipment 200a and the base station 210 of FIG. 2 may exchange one or more TBs via the radio bearers 220a, 220b and 220c. In various example embodiments, one or more error control mechanisms may be implemented for error correction, such as hybrid automatic repeat request (HARQ) at the MAC level and/or automatic repeat request (ARQ) at the RLC level.

More particularly, for example, radio bearers may communicate RLC SDUs to the RLC sub-layer 313. Through segmentation, these RLC SDUs may be separated into RLC PDU data field elements. And through concatenation, the RLC data field elements may be combined into RLC PDUs, each of which may include a PSN. In addition, the RLC PDUs may include a framing information (FI) field that indicates whether the same RLC SDU will continue in the next, succeeding RLC PDU or a new RLC SDU will start in the next RLC PDU. This FI field may specify whether the RLC SDU starts, ends or continues in the present RLC PDU. Possible values may include the following, for example: 00 start and end; 01 start and continue; 11 continue; and 10 continue to end.

The RLC PDUs may become MAC data-PDUs (e.g., MAC SDUs) at the MAC sub-layer 315. The MAC sub-layer may create MAC PDUs, which may or may not include one or more cyclic redundancy codes (CRCs). The physical layer 317 may use the MAC PDUs to create physical layer PDUs (e.g., TB), which may likewise include one or more CRCs. At the receiving end, PDUs between the physical layer 317 and MAC sub-layer 315 may be checked based on their respective CRCs. The MAC data-PDUs may be created from the MAC PDUs and may be passed to the RLC sub-layer 313 as RLC PDUs. At the RLC sub-layer of the receiving end, the RLC PDUs may be reordered based on their PSNs and reassembled into RLC SDUs based on the FI fields of the PDUs.

In various instances, a PDU may be received that includes reserved or invalid values, and in such instances, the receiving end may be directed to discard the PDU. However, it may be possible to for a receiving UM/AM RLC entity to receive RLC PDUs, whose data field element does not belong to a full RLC SDU, even if the protocol data in RLC PDU does not otherwise include reserved or invalid values. This may be indicated, for example, by detecting a value of the FI field (e.g., FI bits) of a received RLC PDU that is inconsistent with the FI bits of previously-received RLC PDUs. FIGS. 4-7 illustrate one example in which a number of RLC PDUs include a single data field element. As shown, the FI bits of the received RLC PDU (PSN=3) indicate that the data field element in this RLC PDU cannot form a full RLC SDU with any of the previously received RLC PDU data field elements (data field element in RLC PDU whose PSN=2). More particularly, the received PDU indicates that it continues to end a previous PDU (FI=10 "continue to end"), but the immediately preceding PDU (PSN=2) does not reflect a continuing PDU and instead reflects an ending PDU (FI=10). And because there are also no missing RLC PDUs, the received RLC PDU data field element is not part of a full RLC SDU.

Figure 4:
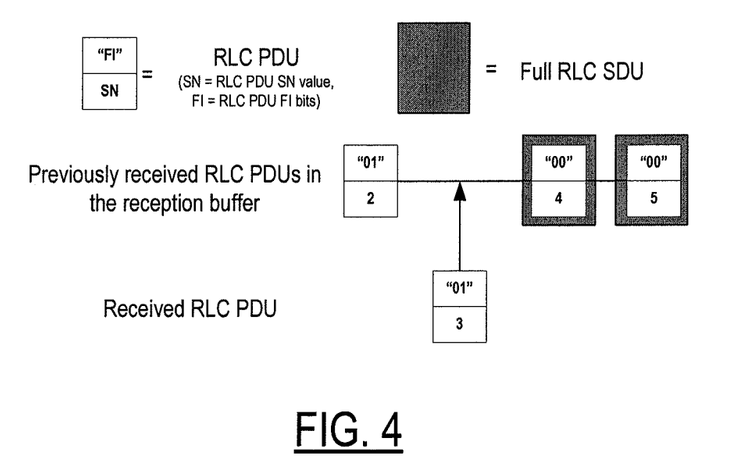
FIGS. 4-7 illustrate instances in which a received PDU includes a data field element that does not belong to a full SDU, and various manners of handling the PDU according to example embodiments of the present invention.

Similar to the received RLC PDU, the immediately preceding RLC PDU (PSN=2) may also not form part of a proper RLC SDU. This is because network will not send another RLC PDU whose PSN=3, because it has already been successfully sent.

Figure 5:
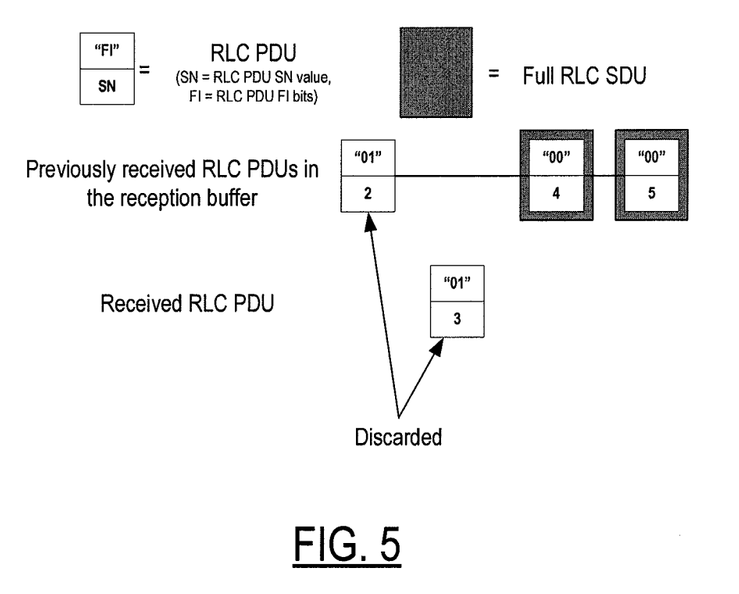
Figure 6:
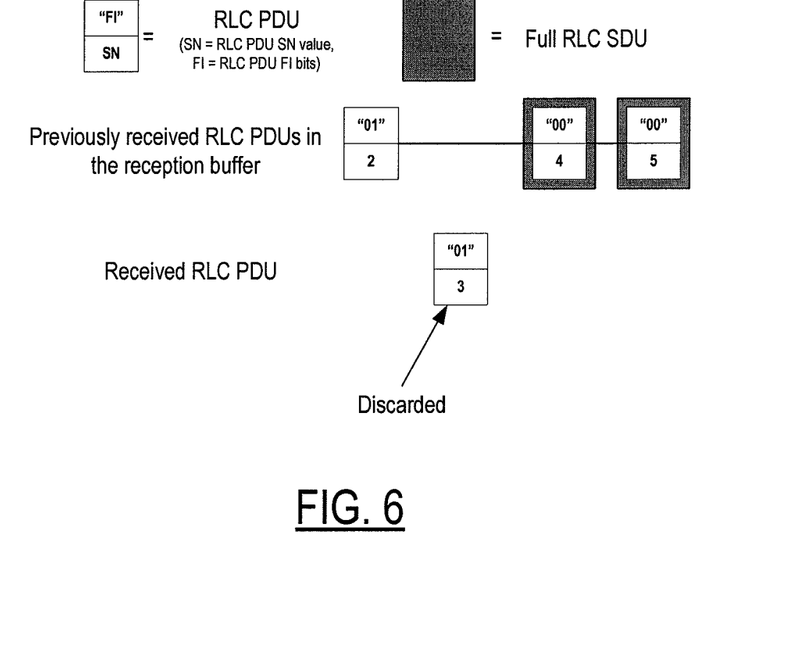

Example embodiments of the present invention are therefore directed to handling these erroneous RLC PDUs, and will be described herein with reference to the illustrations of FIGS. 5-7 and the flowchart of FIG. 8. According to example embodiments of the present invention, the RLC sub-layer 313 or another appropriate layer may be configured to detect or otherwise identify a RLC PDU that does not form part of a proper RLC SDU, as shown in block 900 of FIG. 8. This may be accomplished by comparing the FI bits of a current RLC PDU with those of previously-received RLC PDUs, which may include one or more preceding PDUs and/or one or more succeeding PDUs as may be indicated by the PDUs PSNs. The RLC sub-layer may then handle the respective, detected RLC PDU to permit the apparatus 300 to continue processing PDUs according to an appropriate standard, such as the E-UTRAN standard, as shown in block 910.

The RLC sub-layer 313 may handle the detected RLC PDU in any of a number of different manners. Continuing the example of FIG. 4, as shown in FIG. 5 for example, the RLC sub-layer may be configured to accept the detected RLC PDU, but discard its data field elements that do not belong to a full RLC SDU. The RLC sub-layer may then proceed according to the appropriate standard with respect to the detected and other PDUs. Upper layers at the apparatus 300, then, may be left to decide whether to request retransmission of the respective PDU from the transmitting end.

In another example, the RLC sub-layer 313 may be configured to handle a detected, erroneous RLC PDU by discarding it and report the discarded RLC PDU as missing in any status report that may be generated (e.g., operating in the AM mode according to the E-UTRAN standard). In the case of a detected, erroneous RLC PDU resulting from a CRC calculation error, the RLC sub-layer in the AM mode may proceed according to the appropriate standard as it may be unlikely that a retransmitted RLC PDU will also be corrupted and not detected by CRC calculation. In the case of a detected, erroneous RLC PDU resulting from an implementation error in the transmitter of the transmitting end, the transmitter may keep transmitting erroneous RLC PDUs and the RLC sub-layer may not be able to proceed according to the appropriate standard, although it may also be possible that the transmitter recovers from the error after a particular number of retransmissions.

Figure 7:
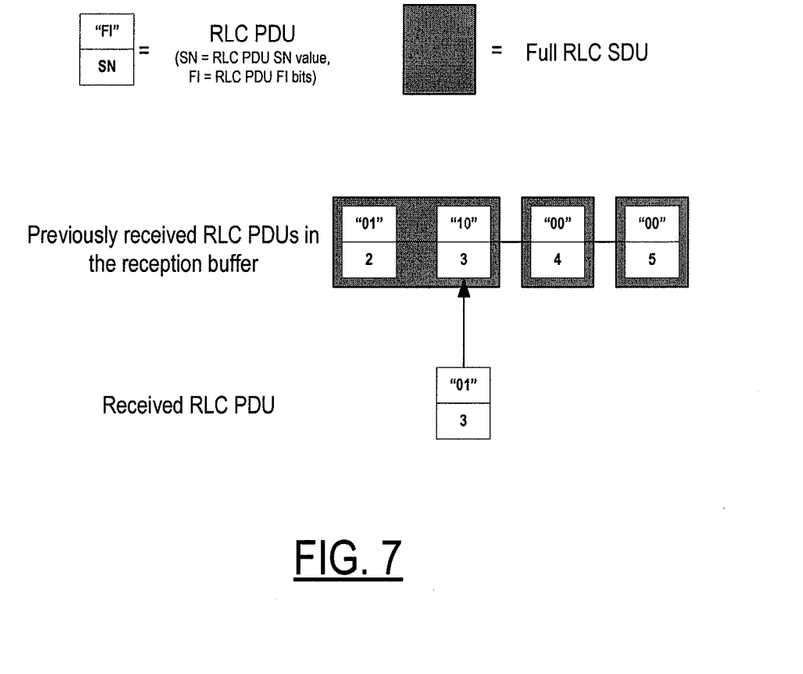

In yet another example, the RLC sub-layer 313 may be configured to handle a detected, erroneous RLC PDU by determining the correct or otherwise correcting the FI bits of the RLC PDU and, if possible, form a full proper RLC SDU from it, as shown in FIG. 7. Determining the correct FI bits for a current RLC PDU (PSN=n) may be accomplished by determining the FI bits of the immediately preceding RLC PDU (PSN=n−1) and immediately succeeding RLC PDU (PSN=n+1). When the preceding RLC PDU includes FI bits specifying that its respective RLC SDU starts and ends (e.g., 00) or continues to end (e.g., 10), the correct FI bits specify that the RLC SDU of the received RLC PDU starts and ends (e.g., 00) or starts and continues (e.g., 01) depending on the FI bits of the succeeding RLC PDU. In this instance, the correct FI bits specify start and end (e.g., 00) when the succeeding RLC PDU starts and ends or continues (e.g., 00 or 01); and the correct FI bits specify start and continue when the succeeding RLC PDU continues or continues to end (e.g., 11 or 10).

Conversely, when the preceding RLC PDU includes FI bits specifying that its respective RLC SDU starts and continues (e.g., 01) or continues (e.g., 11), the correct FI bits specify that the RLC SDU of the received RLC PDU continues (e.g., 11) or continues to end (e.g., 10) depending on the FI bits of the succeeding RLC PDU. That is, the correct FI bits specify continues (e.g., 11) when the succeeding RLC PDU continues or continues to end (e.g., 11 or 10); and the correct FI bits specify continue to end when the succeeding RLC PDU starts and ends or continues (e.g., 00 or 01). These cases are summarized in the table below:

TABLE

| Succeeding RLC PDU | Current RLC PDU FI Bits | | | |
| --- | --- | --- | --- | --- |
| | Preceding RLC PDU | | | |
| | 11 | 10 | 01 | 00 |
| 11 | 11 | 01 | 11 | 01 |
| 10 | 11 | 01 | 11 | 01 |
| 01 | 10 | 00 | 10 | 00 |
| 00 | 10 | 00 | 10 | 00 |

In the example embodiment shown in FIG. 7, the RLC sub-layer 313 may be able to proceed according to the appropriate standard with respect to the detected and other PDUs. However, the RLC sub-layer may not be able to guarantee that the RLC SDU formed from the detected RLC PDU is correct according to the appropriate standard, and may inform the RRC layer 311 of the possible problem with the RLC PDU reception. If so desired, then, the RRC layer may treat the situation as a radio link failure.

In a further example embodiment, the RLC sub-layer 313 may be configured to notify the RRC layer 311 about an error in RLC PDU reception. The RRC layer, then, may handle the error as a radio link failure.

Figure 8:
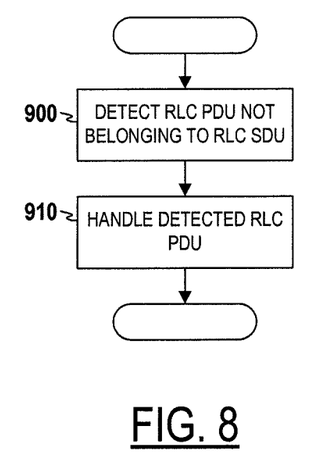
FIG. 8 illustrates a flowchart including various operations in a method of example embodiments of the present invention.

According to one aspect of the example embodiments of present invention, the functions performed by the apparatus 300, such as those illustrated by the flowchart of FIG. 8, may be performed by various means. It will be understood that each block or operation of the flowchart, and/or combinations of blocks or operations in the flowchart, can be implemented by various means. Means for implementing the blocks or operations of the flowchart, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 320 of the example apparatus, and executed by a processor, such as the processor 310 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowchart's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowchart's block(s) or operation(s).

Accordingly, execution of instructions associated with the blocks or operations of the flowchart by a processor, or storage of instructions associated with the blocks or operations of the flowchart in a computer-readable storage medium, supports combinations of operations for performing the specified functions. It will also be understood that one or more blocks or operations of the flowchart, and combinations of blocks or operations in the flowchart, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
wherein the at least one memory and the computer program code are configured to, with the at least one processor, cause the apparatus to at least implement a multi-layered protocol stack including a data link layer and one or more upper layers above the data link layer, the apparatus being caused to at least:
receive a plurality of protocol data units formatted according to a standard that prescribes segmenting sequential service data units into sequential protocol data units, each service data unit being segmented into one or more protocol data units, each protocol data unit including one or more data field elements;
detect at a radio link control sub-layer of the data link layer a current received protocol data unit including one or more data field elements that do not belong to a service data unit;
handle at the radio link control sub-layer the detected protocol data unit by at least accepting the detected protocol data unit but discarding the one or more data field elements of the respective protocol data unit; and
operate according to the standard with respect to the received protocol data units after handling the detected protocol data unit.

2. The apparatus of claim 1, wherein each protocol data unit further includes a sequence number reflecting the sequence of the protocol data units, and includes a value that indicates whether the service data unit from which the respective protocol data unit is formed continues in a succeeding protocol data unit or whether a succeeding sequential service data unit will start in the succeeding sequential protocol data unit, and
wherein the current received protocol data unit comprises detecting the current received protocol data unit based on the value of the respective current protocol data unit, and based on the values of a preceding and a succeeding protocol data unit, the preceding and succeeding protocol data units being identified by the sequence numbers of the respective current, preceding and succeeding protocol data units.

3. The apparatus of claim 2, wherein the detected protocol data unit is handled by at least processing the detected protocol data unit and forming the service data unit from the one or more data field elements of the respective protocol data unit, and
wherein the detected protocol data unit is processed by at least correcting the value of the detected protocol data unit based on the values of the preceding and succeeding protocol data units.

4. The apparatus of claim 1, wherein operating according to the standard further comprises an upper layer deciding whether to request retransmission of the detected protocol data unit.

5. The apparatus of claim 1, wherein the detected protocol data unit is handled by at least discarding the detected protocol data unit including the one or more data field elements of the respective protocol data unit, and
wherein operating according to the standard includes requesting transmission of the detected protocol data unit.

6. A method comprising:
receiving a plurality of protocol data units at an apparatus including a processor configured to implement a multi-layered protocol stack including a data link layer and one or more upper layers above the data link layer, the protocol data units being formatted according to a standard that prescribes segmenting sequential service data units into sequential protocol data units, each service data unit being segmented into one or more protocol data units, each protocol data unit including one or more data field elements;
detecting at a radio link control sub-layer of the data link layer a current received protocol data unit including one or more data field elements that do not belong to a service data unit;
handling at the radio link control sub-layer the detected protocol data unit by at least accepting the detected protocol data unit but discarding the one or more data field elements of the respective protocol data unit; and
operating according to the standard with respect to the received protocol data units after handling the detected protocol data unit.

7. The method of claim 6, wherein each protocol data unit further includes a sequence number reflecting the sequence of the protocol data units, and includes a value that indicates whether the service data unit from which the respective protocol data unit is formed continues in a succeeding protocol data unit or whether a succeeding sequential service data unit will start in the succeeding sequential protocol data unit, and
wherein detecting the current received protocol data unit comprises detecting the current received protocol data unit based on the value of the respective current protocol data unit, and based on the values of a preceding and a succeeding protocol data unit, the preceding and succeeding protocol data units being identified by the sequence numbers of the respective current, preceding and succeeding protocol data units.

8. The method of claim 7, wherein handling the detected protocol data unit comprises processing the detected protocol data unit and forming the service data unit from the one or more data field elements of the respective protocol data unit, and
wherein processing the detected protocol data unit comprises correcting the value of the detected protocol data unit based on the values of the preceding and succeeding protocol data units.

9. The method of claim 6, wherein operating according to the standard further comprises an upper layer deciding whether to request retransmission of the detected protocol data unit.

10. The method of claim 6, wherein handling the detected protocol data unit comprises discarding the detected protocol data unit including the one or more data field elements of the respective protocol data unit, and wherein operating according to the standard includes requesting transmission of the detected protocol data unit.

11. A non-transitory computer-readable storage medium including computer program code which when executed by at least one processor causes operations comprising:
receiving a plurality of protocol data units formatted according to a standard that prescribes segmenting sequential service data units into sequential protocol data units, each service data unit being segmented into one or more protocol data units, each protocol data unit including one or more data field elements;
detecting at a radio link control sub-layer of the data link layer a current received protocol data unit including one or more data field elements that do not belong to a service data unit;
handling at the radio link control sub-layer the detected protocol data unit by at least accepting the detected protocol data unit but discarding the one or more data field elements of the respective protocol data unit; and
operating according to the standard with respect to the received protocol data units after handling the detected protocol data unit.

12. The non-transitory computer-readable storage medium of claim 11, wherein each protocol data unit further includes a sequence number reflecting the sequence of the protocol data units, and includes a value that indicates whether the service data unit from which the respective protocol data unit is formed continues in a succeeding protocol data unit or whether a succeeding sequential service data unit will start in the succeeding sequential protocol data unit, and
wherein detecting the current received protocol data unit comprises code for detecting a current received protocol data unit based on the value of the respective current protocol data unit, and based on the values of a preceding and a succeeding protocol data unit, the preceding and succeeding protocol data units being identified by the sequence numbers of the respective current, preceding and succeeding protocol data units.

13. The non-transitory computer-readable storage medium of claim 12, wherein the handling the detected protocol data unit comprises processing the detected protocol data unit and forming the service data unit from the one or more data field elements of the respective protocol data unit, and
wherein the processing the detected protocol data unit comprises correcting the value of the detected protocol data unit based on the values of the preceding and succeeding protocol data units.

14. The non-transitory computer-readable storage medium of claim 11,
wherein operating according to the standard further comprises an upper layer deciding whether to request retransmission of the detected protocol data unit.

15. The non-transitory computer-readable storage medium of claim 11, wherein the handling the detected protocol data unit comprises discarding the detected protocol data unit including the one or more data field elements of the respective protocol data unit, and
wherein the operating according to the standard includes requesting transmission of the detected protocol data unit.

16. The apparatus of claim 1, wherein the apparatus is further configured to handle at the radio link control sub-layer at least one of discarding the detected protocol data unit including the one or more data field elements of the respective protocol data unit; processing the detected protocol data unit and forming a service data unit from the one or more data field elements of the respective protocol data unit; or notifying an upper layer about an error in reception of the protocol data units to thereby enable the upper layer to handle the error as a radio link failure.

17. The method of claim 6, wherein the handling at the radio link control sub-layer at least one of discarding the detected protocol data unit including the one or more data field elements of the respective protocol data unit; processing the detected protocol data unit and forming a service data unit from the one or more data field elements of the respective protocol data unit; or notifying an upper layer about an error in reception of the protocol data units to thereby enable the upper layer to handle the error as a radio link failure.

18. The non-transitory computer-readable storage medium of claim 11, wherein the handling at the radio link control sub-layer at least one of discarding the detected protocol data unit including the one or more data field elements of the respective protocol data unit; processing the detected protocol data unit and forming a service data unit from the one or more data field elements of the respective protocol data unit; or notifying an upper layer about an error in reception of the protocol data units to thereby enable the upper layer to handle the error as a radio link failure.

* * * * *